Dec. 21, 1965  W. G. COOK ETAL  3,224,380
REPLENISHMENT-AT-SEA RECEIVING APPARATUS
Filed Feb. 13, 1964  4 Sheets-Sheet 1

INVENTORS
WARREN G. COOK
KENNETH E. MATHEWS
JAMES L. HILL

ATTORNEYS

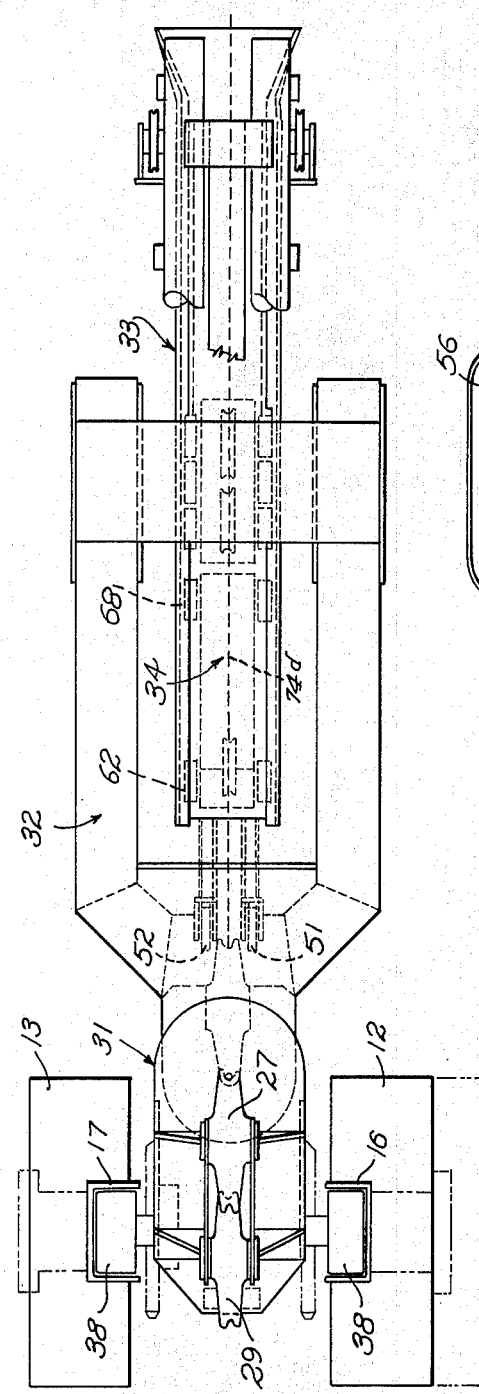
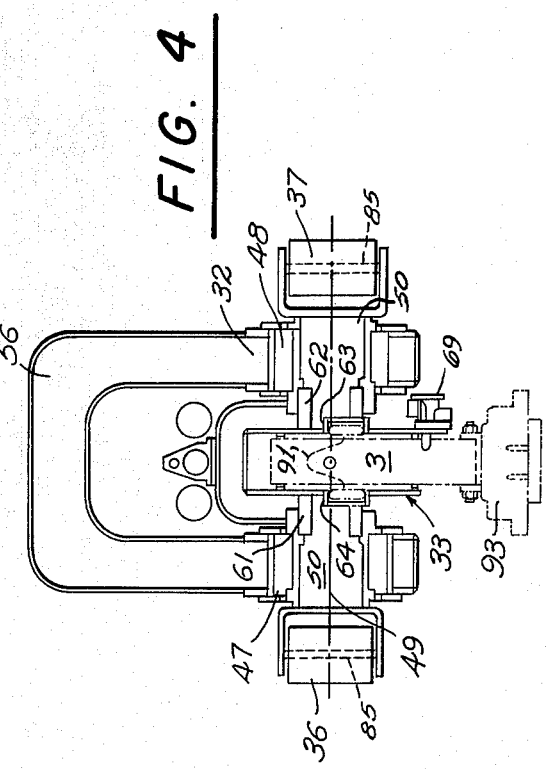

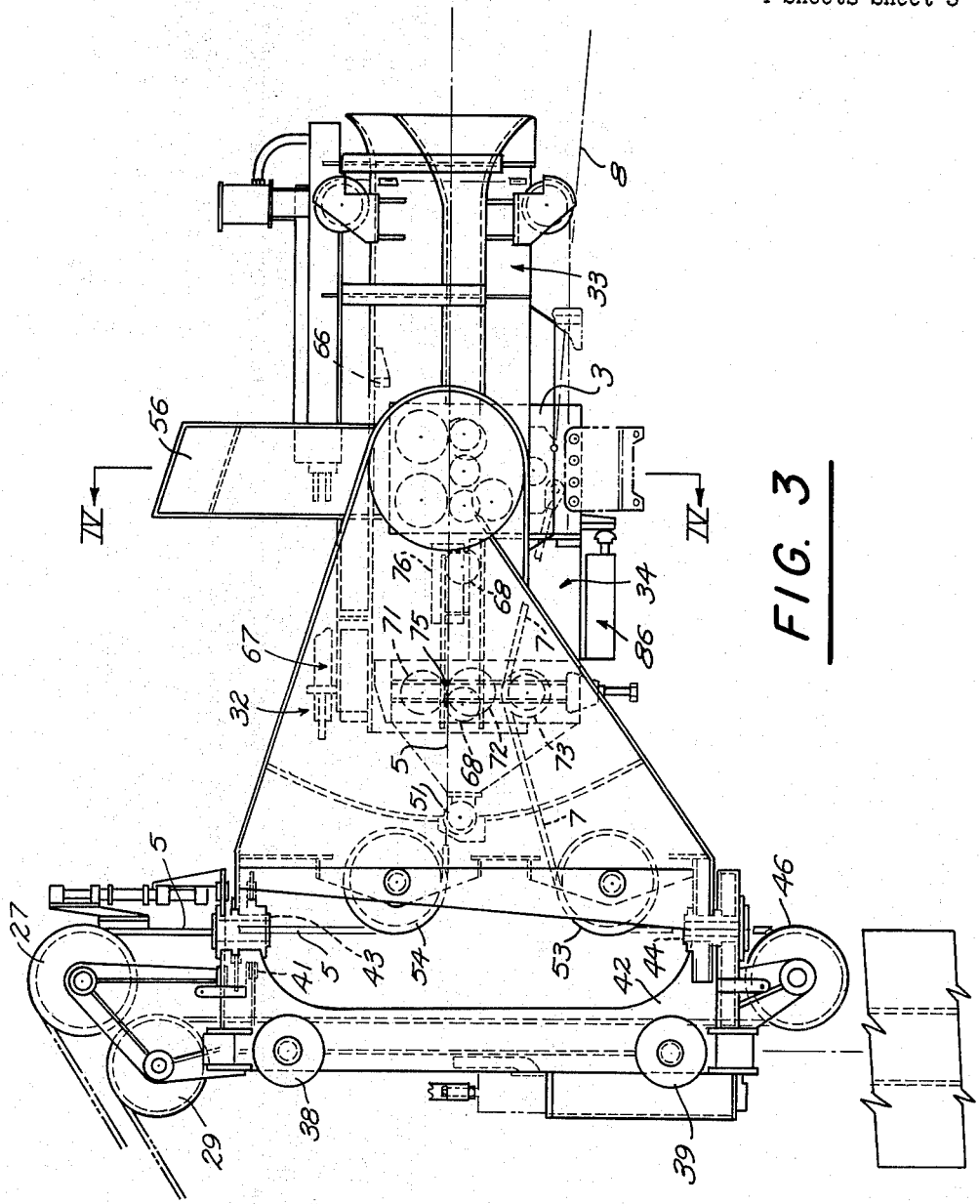

United States Patent Office 3,224,380
Patented Dec. 21, 1965

3,224,380
REPLENISHMENT-AT-SEA RECEIVING
APPARATUS
Warren G. Cook, Bremerton, Kenneth E. Mathews, Poulsbo, and James L. Hill, Bremerton, Wash., assignors to the United States of America as represented by the Secretary of the Navy
Filed Feb. 13, 1964, Ser. No. 344,794
9 Claims. (Cl. 104—114)
(Granted under Title 35, U.S. Code (1952), sec. 266)

The invention described herein may be manufactured and used by or for the Government of the United States of America for governmental purposes without the payment of any royalties thereon or therefor.

The present apparatus relates generally to replenishment-at-sea operations and, more specifically, to apparatus for receiving objects transferred between stations during such operations.

Replenishment-at-sea is a term applied to the transfer between moving ships of supplies such as general stores, ammunition and other cargo. Customarily, transfer lines are rigged between the underway ships and the supplies are carried from one to the other by means of a trolley that rides and is moved by haul lines. One particular rig, presently utilized for this purpose, is known as a tensioned high line in which the tension of a winch-driven high line is controlled in conformity with random ship separation and other varying conditions to maintain a desired tautness. In this particular rig, inhaul and outhaul lines usually are secured to the trolley to effect the actual transfer of the trolley and its suspended load.

Although other replenishment-at-sea rigs may be employed, the principles of the present invention have particular applicability to the so-called tensioned high line and the ensuing description will refer specifically to it. Nevertheless, it will be appreciated that the present principles can be employed in other environments.

A need has arisen for transferring bare weapons and weapon components, such as missiles or their boosters, between ammunition supply ships and the combatant-type ships. Obviously, in such an undertaking, it is most important to assure a safe, non-hazardous handling or, in other words, in a disposition in which it is parallel to the plane of the ship's deck. Also, a complete transfer operation includes not only the actual transfer from one ship to another, but also the transfer of the weapons from the receiving or delivering apparatus to the desired stowage area of the recipient ship, this stowage space normally being below the main deck level. To accomplish these purposes, systems have been designed which pick up the bare weapon at or near the stowage level, raise it to a point well above the weather deck where it is physically secured to the mechanism which carries it on to the combatant ship. The same systems also must be capable of receiving the load, usually at an elevated level, and then lowering it to the main deck level. Although all phases of the operation require great care and precision, this receiving and lowering phase perhaps presents the greatest difficulty. Thus, the weapons, which are swung from the trolley must be safely captured, then indexed horizontally to a fixed position directly athwart ship, lowered to the stowage area in this indexed position, and gently deposited on whatever particular conveyor means is used for finally transporting the weapons to their stowage area. All of these steps must be accomplished with absolute precision and without subjecting the weapons to shock loads of more than four "G's".

It is, therefore, an object of the present invention to provide trolley-receiving apparatus for replenishment-at-sea operations, the apparatus being capable of aligning itself in the most favorable disposition for receiving and capturing the trolley, and further being capable of precisely indexing the trolley and its supported load into a particular fixed position in which the load can be deposited for stowage.

A more specific object is the provision of a receiving apparatus capable of tracking the tensioned high line both horizontally and vertically for the purpose of keeping the throat of the receiving mechanism constantly in position to receive the trolley.

Yet another object, which will be better understood, is one of physically forcing the trolley and its load during the capture operation into a particular position in which the trolley and its load lie in a horizontal plane substantially parallel to the plane to the ship's deck.

Another object of considerable significance is the provision of a mechanism for indexing the trolley horizontally to a fixed position directly over and in line with the deck location on which the load is to be deposited.

Other objects and their attendant advantages will become more apparent.

Generally considred, the objects of the present invention in part are achieved by providing a receiving apparatus in which the elements track the tensioned high line both vertically and horizontally to dispose the apparatus at all times in the proper position for receiving the trolley. Also, the apparauts employs a special camming means capable of indexing the load into proper position for being deposited at the stowage area. One particular feature which will become more apparent in later description is the ability of the apparatus to utilize the tensioned high line as a flexible cam to force the receiving apparatus into a desired horizontal disposition relative to the base line of the ship.

The invention is illustrated and described in the accompanying drawings of which:

FIG. 2 is a plan view of the receiving apparatus itself, this view eliminating, for simplification purposes, certain elements such as a pair of horizontal alignment arms and a pair of cam tracks associated with these arms;

FIG. 3 is an elevational view of the apparatus shown in FIG. 2;

FIG. 4 is a view along lines IV—IV of FIG. 3;

Figure 1:
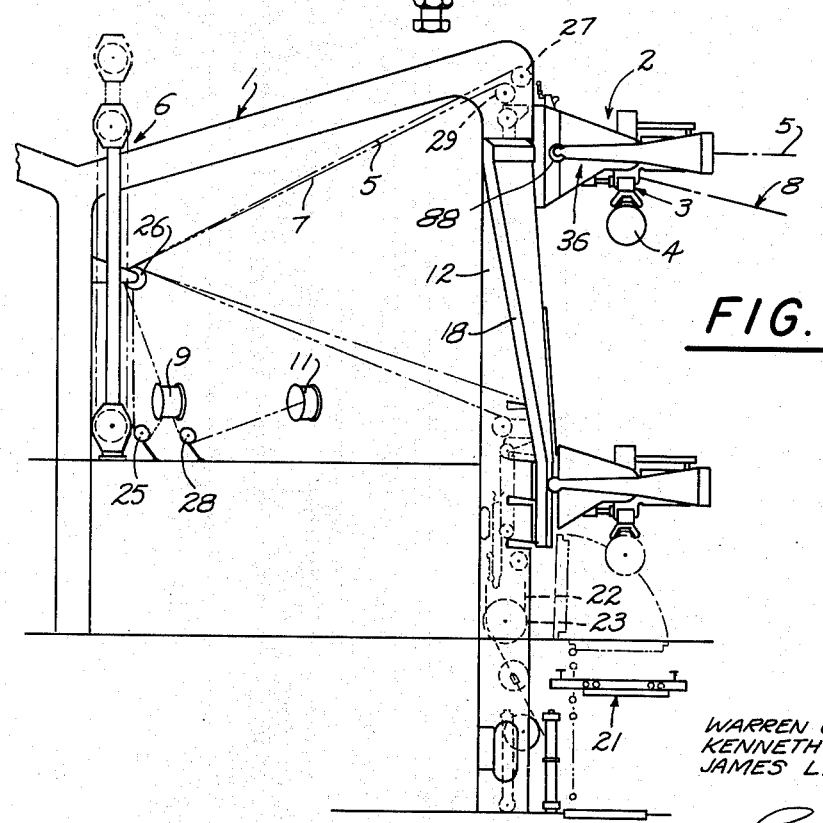
FIG. 1 is a schematic elevation illustrating a typical arrangement of the apparatus, as well as associated components utilized in the replenishment-at-sea operation.

Referring to FIG. 1, the replenishment-at-sea apparatus there shown consists an "M" frame 1, a transfer or receiving head 2, a high line trolley 3 supporting a load 4, a high line 5 on which the trolley operates, a ram tensioner 6 to tension the high line, inhaul and outhaul lines 7 and 8 to move the trolley along the high line, and winches 9 and 11 for the high line and the inhaul and outhaul lines.

The "M" frame, as its name indicates, is shaped like a capital "M," it being installed athwart ship with the center of the "M" at the center line of the ship and the main legs to port and starboard. Each outboard leg of the "M" frame is composed of two parallel columns 12 and 13 (FIG. 2) (one forward and one aft) joined at the deck level by the ship structure and at the top by a tie bar. The inside faces of the parallel columns are fitted with roller paths 16 and 17 to receive transfer head 2, these paths extending to the top of the columns to permit installation and removal of the transfer head with a minimum of effort.

A particularly significant feature of the invention is the fact that the forward and after faces of the outboard legs of the "M" frames are fitted with identical cam plates or tracks 18 and 19 to cam the transfer head horizontally into alignment with a component lift mechanism 21 during the vertical travel of the transfer head from the top of the frame to the transfer point at the weather deck level. Component lift 21, it will be noted, is a mechanism utilized below the weather deck level to convey bare weapons or the like from their stowage location to a suitable level for pick-up and handling by transfer head 2. Also, to move the transfer head vertically up and down the parallel columns or stanchions 12 and 13, a sprocket driven chain 22 may be utilized. As shown in FIG. 1, the drive for the chain includes a driven sprocket 23 and a second sprocket (not shown) carried at the top of the parallel columns. The chain is secured to transfer head 2 to cause the head to move up or down.

A transfer-at-sea operation is accomplished by means of a high line 5 and inhaul and outhaul lines 7 and 8. Such lines are conventional, as is a ram tensioner 6 used to tension the high line. Considering the illustrated arrangement, high line 5 is wound on a high line winch 9 from which it is passed over a sheave 25 and around vertically spaced sheaves of ram tensioner 6 before being led to a sheave 26 and on to another sheave 27 of the transfer head. Ram tensioner 6 operates in the expected manner to sense tension variations in the high line and to expand or contract its high line loop sufficiently to compensate for the variations. The inhaul line 7 is wound on an inhaul winch 11 from which it is passed around sheaves 28, 26 and 29 into the transfer head proper.

An exemplary use of the apparatus thus far described would be as follows: sprocket 23 may be driven to lower the transfer head to the deck level at which point a load 4, which may be a missile, is secured to an adapter of the trolley mechanism. The drive of sprocket 23 then is reversed to raise the transfer head with the load to the upper level illustrated in FIG. 1, this being the level at which the load would be transferred. The trolley, which during this time normally is secured in the transfer head, then is released to permit its travel from the supply station to a receiving station. The travel of the trolley is accomplished by driving an outhaul winch which may be disposed either at the supply or the recipient station. The trolley travels across the intervening space between the ships, the transfer lines, of course, extending from one ship to the other. In a similar manner, a load can be returned to the supply ship and lowered by the transfer head to the level of component lift 21. One significant advantage of this type of operation is that the trolley engages the load during the entire interval from the time it leaves the stowage area until it is delivered to the stowage area level of the recipient ship or vice versa.

The features of the invention are more directly concerned with transfer head 2 and the already-mentioned cam tracks 18 and 19. Considering transfer head 2, first it may be noted that it is formed of five major components, these being a sliding block 31, an outrigger member 32, a cradle member 33, a carriage 34 and a pair of horizontal alignment arms 36 and 37.

Figure 6:
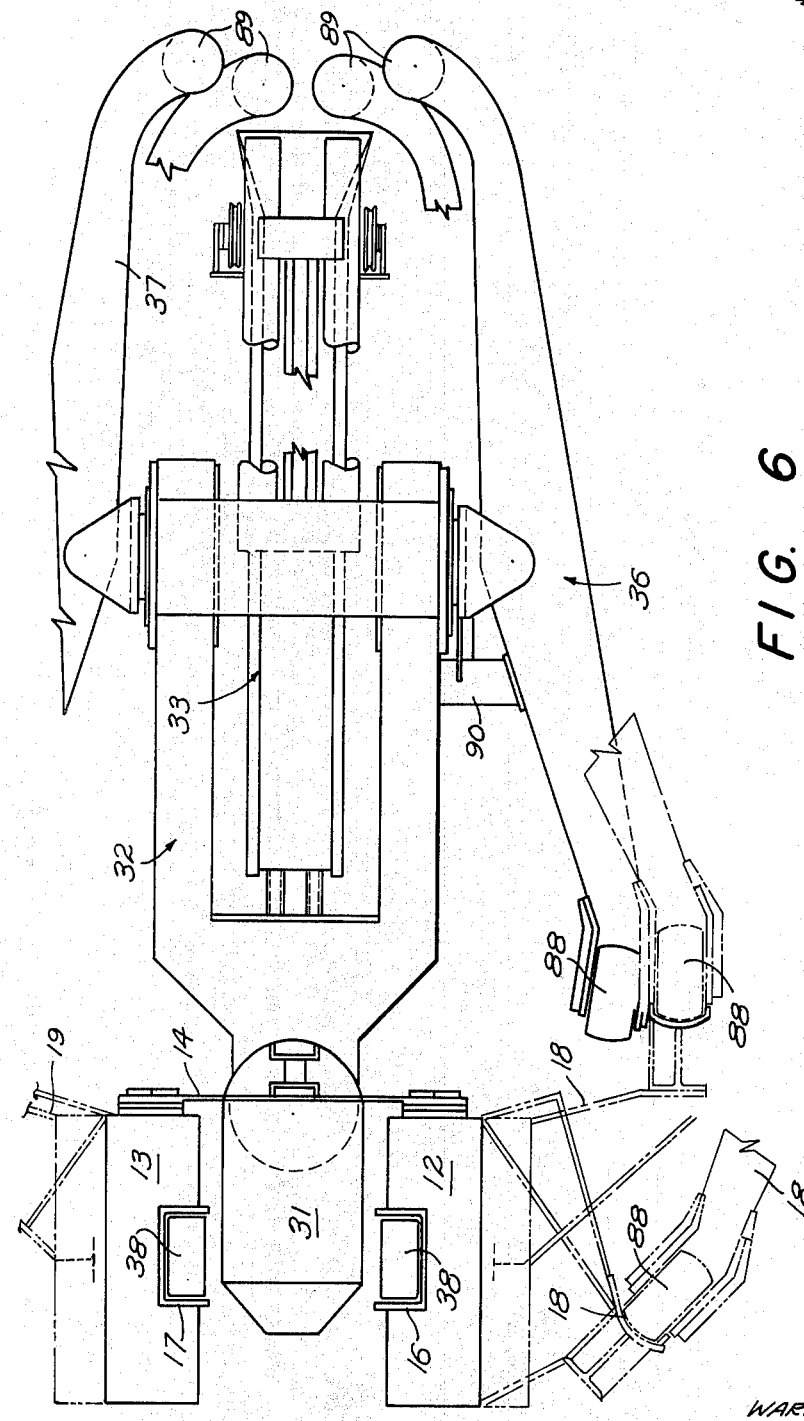
FIG. 6 is a somewhat schematic plan view of the receiving apparatus illustrating the structure and operation of particular horizontal alignment arms and their camming tracks.

The structure of sliding block 31 best may be seen in FIGS. 2, 3 and 6, this block, which, to be more technically correct, is a rolling block, being formed of a rigid frame fitted top and bottom with rollers 38 and 39 that operate in roller paths 16 and 17 of the "M" frame columns. The rollers are designed to take all of the horizontal loads imposed on the transfer head and to permit free vertical travel of the head from the top of the column to the weather deck level. Projections 41 and 42 (FIG. 3) are formed on the outboard face of the sliding block at top and bottom, these projections providing the hinge points on which outrigger member 32 is mounted. Specifically, the mounting includes hinge pins 43 and 44 each of which has a central bore to receive the transfer lines in a manner to be described. These hinge points take the horizontal and vertical loads imposed on the sliding blocks by the outrigger, and provide a vertical axis of rotation about which the outrigger freely swings in a horizontal plane.

Sliding block 31 further carries a sheave 27 and it is to be particularly noted that high line 5 as it proceeds from sheave 27 is reeved through hinge pin 43 so as to align axially with the vertical pivotal axis of the outrigger. In a similar manner, inhaul line 7 proceeds from sheave 29 carried by the sliding block to another sheave 46 and then axially through the bore of hinge pin 44 to align the inhaul line with the pivotal axis of the outrigger.

Outrigger 32 is a U-shaped, rigid box frame (FIGS. 2 and 3) with its inboard end closed and the legs of the U extending outboard, one forward and one aft. The closed inboard end of the outrigger is fitted with hinge points top and bottom for attachment to sliding block 31 (FIG. 3), while the open, outboard arms each are fitted with bearings 47 and 48 to carry previously-identified cradle member 33 and alignment arms 36 and 47. Specifically, cradle member 33 carries trunnions 50 extending through the bearings, the alignment arms 36 and 37 being attached to these trunnions. Further, for future descriptive purposes, the pivotal axis of these trunnions is identified by numeral 49.

The closed inboard end of outrigger 32 also is provided with recesses to receive rollers 51 and 52 (FIGS. 2 and 3), these rollers being carried by carriage 34 and functioning in a manner yet to be explained. Also, the inboard closed end of member 32 is slotted to receive and mount sheaves 53 and 54 for inhaul line 7 and highline 5, respectively. Significantly, however, sheave 54 is located precisely so that a line from the pass of this sheave through pivotal axis 48 of trunnions 50 is parallel to the base plane of the ship.

The forward and after legs of outrigger 32 are connected at the top by an arch or yoke 56, but the extreme outboard end of the outrigger is open to allow passage of trolley 3 and its load, as well as to permit free vertical oscillation of cradle 33 between its legs.

Cradle 33 is a channel-shaped member, open at the outboard end and the bottom to receive trolley 3. Also, it is open at its inboard end to permit passage of inhaul line 7, highline 5 and the inboard end of carriage 34. As previously mentioned, it carries, at its center portion, trunnions 50.

Carriage 34 is reciprocably carried by cradle 33 and, for this purpose, the inside of the cradle is provided with roller guide tracks 63 and 64. In a manner which will become obvious, these tracks receive rollers of both the carriage and the trolley and they extend the full length of the cradle. To limit the outboard movement of the carriage the cradle mounts fixed stops 66. Inboard movement is limited by a hydraulic buffer mechanism 67. A carriage lock 69 (FIG. 4) also is used to engage in a hole in the side of trolley 3 when the trolley is in a fully-captured disposition.

Carriage 34 is a rectangular box having four rollers 68, two each on the forward and after sides, the rollers engaging and operating in tracks 63 and 64 of the cradle. Also, as already indicated, carriage rollers 51 and 52 are supported on a bracket at the inboard end of the carriage, these rollers engaging the outrigger recesses to hold both the carriage and the cradle level with the base line of the ship when the carriage has been moved horizontally to its innermost position. The rollers 51 and 52 are located one forward and one aft of a longitudinal center line 74d (FIG. 2) of the carriage to leave an open area for the passage of the inhaul line and highline. Inside the inboard end of the carriage are three sheaves 71, 72 and 73, these sheaves being located directly on the center line 74d of the carriage, one above highline 5, the other below this highline, and the third near the bottom of the carriage for inhaul line 7. As best seen in FIG. 3 highline 5 proceeds from outrigger sheave 54 through the pass of carriage sheaves 71 and 72, the axial center of this pass being designated by numeral 75. Highline 5 then passes through a sliding shoe assembly 76 from which it proceeds outwardly of the transfer head and on to the other ship which is coupled for transfer purposes. Inhaul line 7 (FIG. 3) proceeds from outrigger sheave 53 over cradle sheave 73 and on to trolley 3 to which it is attached. Outhaul line 8 which, in effect, is a continuation of the inhaul line, is attached to the other side of trolley 3 and, of course, the outhaul line proceeds to the other ship.

An important factor which should be noted at this juncture is that, when carriage 34 is in its extreme outboard position against stop 66, the center line of pass 75 of its highline sheaves is horizontally aligned with pivotal axis 49 (FIG. 4) of the cradle. Consequently, any vertical forces tending to depress or raise the carriage or cradle are freely transmitted to these members without the presence of any lever arms so that, in other words, the cradle becomes freely rockable. The cradle is moved to its outer position preferably by means of hydraulic buffer 67 which is provided with recovery springs, not shown, for this purpose. Any other suitable mechanism would suffice.

Figure 5:
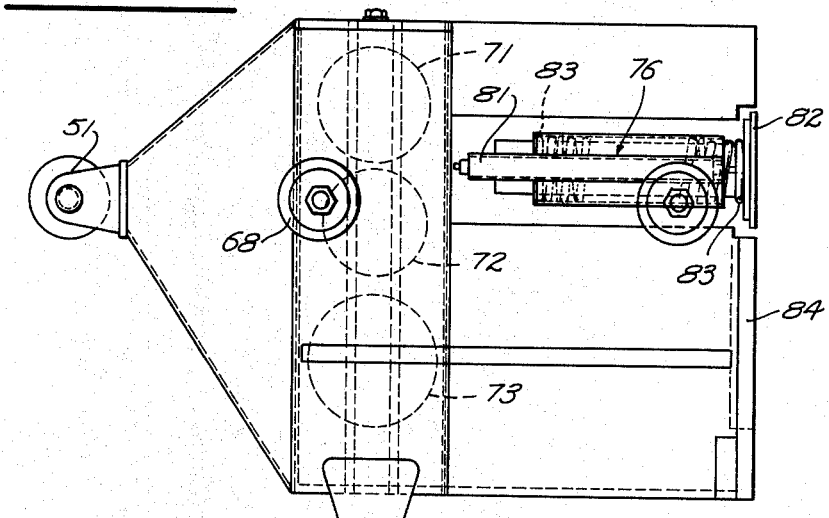
FIG. 5 is an enlarged detail in elevation of a particular carriage member and a sliding shoe associated with this member.

Sliding shoe unit 76 (FIGS. 3 and 5) is a functionally significant element principally because of its ability to extend the effective lever arm of the carriage. In other words, a lever arm tending to pivot the carriage is provided by the extent of the highline between pass 75 of the carriage sheave and the exit point of the sliding shoe unit. As shown in FIG. 5, the sliding shoe unit includes a pair of axially-aligned rods 81 (only one of these rods being illustrated), both of which attach to a face plate assembly 82 and all of which are mounted in a spring housing incorporating a coil spring 83 which bears at its inward end against the housing and at its outer end against a portion of face plate assembly. Also, the plate assembly has a central bore through which highline 5 extends and, in a similar manner, the highline extends directly through the center line of the housing. As will be obvious, spring 83 normally urges face plate 82 outwardly of a face 84 of the carriage so that, when the trolley enters the transfer head mechanism, it first strikes the sliding shoe unit. This unit, in addition to extending to lever arm of the carriage, also provides some measure of shock mitigation since the initial thrust of the trolley against the carriage is counteracted by the force of spring 83. A small hydraulic buffer mechanism 86 (FIG. 3) also is provided at the bottom outboard end of the carriage to mitigate the impact of the trolley.

Horizontal alignment arms 36 and 37 provides another feature of the invention and the structure and function of these arms best is illustrated in FIGS. 1 and 6. Their primary purpose is to index the transfer head horizontally into alignment with component lift 21 as the transfer head descends from the top of the "M" frame to the deck level. They are beams of box construction which are attached at their mid-length to the ends of trunnions 50 of the cradle. Attachment of the arms to the trunnions is by means of vertical hinge pins 85 so designed as to permit limited horizontal oscillation of the arms with respect to the outrigger to force the arms to track the highline vertically along with the carriage and the cradle. The inboard ends of the arms each are fitted with a horizontal roller 88 adapted to rollably engage cam tracks 18 and 19 which, as previously described, are carried by "M" frame columns 12 and 13. Also, the outboard ends of the arms are fitted with vertical rollers 89 designed to fairlead the highline into the transfer head. A tension spring mechanism 90 also may be provided to hold the inboard rollers normally clear of tracks 18 and 19 and also to maintain outboard rollers 89 in an open position to permit entry of the trolley. The function of horizontal arms 36 and 37 should be reasonably apparent, although it will be further considered in the summarizing description of the entire operation of the receiving mechanism.

Other aspects of the illustrated apparatus are somewhat conventional and will be described primarily to facilitate a fuller understanding. For example, trolley 3 is a rectangular block fitted with six rollers 91, (FIG. 4) three each on the forward and after sides to engage guide tracks 63 and 64 of cradle member 33 when the trolley is being captured. At its bottom, the trolley mounts a strongback adapter 93 to permit quick attachment for the handling of various weapon components.

Controls for the operation best are located forward or aft of the stations to give an operator full view of the transfer head and the landing area at all times. If desired, signal lights, or other indicating devices may be included to indicate the position of the ram-tensioner, as well as such conditions as trolley locked in, trolley unlocked, transfer head up, and transfer head down.

In operation, with transfer head 2 at the deck level directly over component lift 21, and with the trolley and carriage locked in and the highline tensioned, a weapon with its strongback attached is delivered and secured to the strongback adapted 93 of the trolley. The transfer head then is raised to the top of the "M" frame, and, during the upward travel of the head the inboard rollers 88 of the horizontal alignment arms leave the cam tracks so that outboard rollers 89 open. The outrigger assembly 32, being guided by the sheaves in carriage 34 and by the trolley riding on the highline, begins to track the highline in the horizontal plane. When the transfer head reaches the top of the "M" frame, lock 69 which holds the trolley and carriage in its captured position is released. The release of the trolley may be electrically actuated using a solenoid arrangement for withdrawing the locking pin. The lock then is held in its retracted position until the return of trolley at which time the solenoid may be de-energized and the lock permitted to resiliently engage the hole in the trolley. Of course, suitable hydraulic or pneumatic release mechanisms could be substituted. The trolley and its load then is moved out along the highline by taking in the outhaul and paying out the inhaul lines. As the trolley leaves the transfer head, the carriage is forced outboard to a fixed point by buffer mechanism 67 which, as has been stated, includes recovery springs for this purpose. Also, spring loaded sliding shoe unit 76 moves outwardly to place its face 82 a spaced distance from the outboard end of the cradle. As the carriage moves outboard, rollers 51 and 52 at its inboard end disengage from their outrigger recesses thereby permitting the cradle to oscillate vertically on its trunnions except, of course, as limited by the sheaves in the carriage and by the sliding shoe riding the highline.

When the carriage is in its outboard position, against the stops 66 of the cradle, the center line of the highline sheaves 71 and 72 are in line with the pivotal axis 49 of trunnions 50 of the cradle, permitting the cradle to track the highline freely in a vertical plane guided only by the sliding shoe. The transfer head then is tracking the highline both vertically and horizontally and is ready for the receiving portion of the transfer cycle.

In receiving the load, the trolley, which is moved along the highline by taking in on the inhaul and letting out on the outhaul, enters cradle 33 and rollers 91 on the sides of the trolley engage in tracks 63 and 64 of the cradle in the manner shown in FIG. 4. Preferably, these guides or tracks have their outer ends flared to guide the rollers into proper position. As the trolley continues to move into the cradle it first contacts face 82 of the sliding shoe moving it inboard toward the face of the carriage. It then contacts small hydraulic buffer 67 which mitigates its impact and starts to force the carriage.

Up to this point, the cradle has been tracking the highline freely in the vertical plane due to the fact that, as already stated, the angle of depression of the cradle up to this point has been dependent upon the load being transferred, the tension of the highline and the relative height of the transfer heads. Further, the lead of the highline from pass 75 to sheave 54 of the outrigger (FIG. 3) has been parallel to the base plane of the ship.

As the carriage is forced inboard of the center line of the trunnion (FIG. 3), the sheaves of the carriage tend to force the highline upwardly to place a bend in its straight line disposition, the bend being due to the fact that the carriage is at a depressed angle due to the weight and dynamic effect of the incoming load. This displacement, produced by the bend of the tensioned highline, together with the fact that the sheave causing the displacement are not inboard of the center line of the trunnions, creates a righting moment tending to rotate the cradle back into a position parallel to the base plane of the ship. As the carriage moves further inboard, the effective lever arm increases, and for a given depression angle, the displacement of the highline also increases, thus increasing the righting moment. Furthermore, as the trolley and its load approach the center line of the trunnion and as the dynamic forces are absorbed by the buffers acting on the carriage, the moments causing the depression of the cradle are decreased. Thus, the cradle, with the carriage and the trolley approaching the locked position, is brought to a position parallel to the base plane of the ship. At the final extent of travel of the carriage and the trolley, the rollers at the inboard end of the carriage enter the recesses in the outrigger and the lock in the cradle engages the hole in the trolley, thus securing the cradle, the carriage, and the trolley with its load in a fixed position with respect to the outrigger.

After the trolley is locked in, the transfer head is lowered from its received position at the top of the "M" frame to the deck level transfer point where it is brought to a smooth stop preferably by a hydraulic buffer. During the downward travel of the head, the rollers on the inboard end of the horizontal alignment arm contact the cam guides on the "M" frame. These different positions of the horizontal alignment arm are illustrated in FIG. 6. Also, FIG. 6 illustrates another position in which the entire transfer head has been rotated 45° by a horizontal swinging movement due to its tracking of the highline. Obviously, when such a condition pertains, the downward movement of the transfer head will re-orient the head in the desired horizontal plane. In the downward movement of the head, the cams 18 and 19, as well as the horizontal arms, are rotated with respect to the outrigger until outboard rollers 89 are closed against the highline. As the head continues to approach the deck level transfer point, the arms, with the inboard rollers bearing against the cam tracks and the outboard rollers bearing against the highline, rotate the outrigger assembly into a fixed position directly athwartship over component lift 21. At the bottom of the travel, the missile or weapon is detached from the trolley and may be transported away for storage.

The advantages of the present invention have been generally considered in the foregoing description. Obviously, one advantage is the ability of the system as a whole to safely and securely transport hazardous weapons between ships. Another advantage, predicated in part upon the precision provided by the apparatus, is the increased speed at which transfers can be effected. In particular, these advantages involve the ability of the transfer head to precisely and constantly track the highline so as to present the throat of the head at all times to the incoming load. The horizontally-swinging outrigger along with the rockably mounted cradle and its reciprocable carriage are highly instrumental in achieving these beneficial results. The use of the highline sheaves mounted to the rear of the reciprocable carriage, as well as the sliding shoe at its forward end, is a factor which materially improves the tracking and capture functions. Further, the ability to utilize the highline as a flexible cam for the purpose of righting the cradle into a position parallel to the base plane of the ship is a valuable feature. Finally, the horizontal alignment arms and their cam arrangement assures proper indexing which permits a safe transfer of the missile from the trolley adapter to its component lift of the stowage apparatus.

Obviously, many modifications and variations of the present invention are possible in the light of the above teachings. It is therefore to be understood that within the scope of the appended claims the invention may be practiced otherwise than as specifically described.

What is claimed is:

1. Apparatus for receiving objects transferred to a station by means of a trolley supported on a haul line and a tensioned line, comprising:
    an outrigger member pivotally carried at its inner end by said station and extending laterally outwardly of the station, said member being mounted on a vertical axis whereby said member is swingable horizontally,
    a cradle member medially carried by and extending laterally of said outrigger member, said cradle member being pivotally mounted on a horizontal axis whereby said cradle is rockable vertically about said axis,
    a carriage mounted in said cradle for reciprocable movement laterally thereof,
    a pair of vertically-disposed axially-aligned adjacent sheaves carried at the inner end of said carriage, and
    means normally-positioning said carriage with the axis of its sheaves aligned with the pivotal axis of said cradle,
    said cradle having an open end adapted to receive said trolley and guide the trolley into contact with said carriage, and
    said tensioned line of the object-transferring apparatus being threaded through the pass of said adjacent sheaves,
    whereby said carriage and cradle pivot vertically as a unit in response to forces acting on said tensioned line and said apparatus as a whole is swingable horizontally by said line,
    said carriage being resiliently retractable by said received trolley for moving said sheave axis away from said cradle axis whereupon said tensioned line acts as a flexible cam urging the cradle into a horizontal disposition.

2. The apparatus of claim 1 further including:
    a pair of spaced stanchions mounted at said station,
    a block vertically reciprocable along said stanchions,
    said outrigger member being pivotally mounted on said block, and
    said tensioned and haul lines being carried by said block and said outrigger.

3. The apparatus of claim 2 further including:
    a pair of elongate laterally-extending alignment arms pivotally carried medially one on each side of said outrigger on aligned vertical axes,
    a cam track carried by each stanchion and extending substantially the full lengths thereof, said arms being provided at their inner ends with cam track-engaging means and further having their outer ends disposed for pivotally closing about said tensioned line outwardly of said cradle, and
    means normally urging said arms into an opened position,
    said cam tracks being shaped to close said arms during a descending movement of said reciprocable block along said stanchions and further, during said movement, to cause said arms to pivotally swing into a position normal to said stanchions, whereby said apparatus is moved into said normal position.

4. The apparatus of claim 1 wherein said outrigger member is pivotally carried on a pair of vertically aligned hinge pins, and said outrigger mounts an idler sheave, said tensioned line being reeved through the upper hinge pin downwardly around said sheave and then through the pass of said cradle sheaves, said sheave being so disposed that the extent of line from said outrigger sheave to said cradle sheaves normally is substantially horizontal.

5. Apparatus for receiving objects transferred to a station by means of a trolley supported on a haul line and a tensioned line, comprising:

an outrigger member pivotally carried at its inner end by said station and extending laterally outwardly of the station, said member being mounted on a vertical axis whereby said member is swingable horizontally, a cradle member medially carried by and extending laterally of said outrigger member, said cradle member being pivotally mounted on a horizontal axis whereby said cradle is rockable vertically about said axis, a carriage mounted in said cradle for reciprocable movement laterally thereof, a pair of vertically-disposed axially-aligned adjacent sheaves carried at the inner end of said carriage, a shoe slidably carried at the outer end of the carriage, resilient means urging said shoe outwardly of the carriage, and means normally-positioning said carriage with the axis of its sheaves aligned with the pivotal axvis of said cradle, said cradle having an open end adapted to receive said trolley and guide the trolley into contact with said outwardly extending shoe, and said tensioned line of the object-transferring apparatus being threaded through the pass of said adjacent sheaves, and through said shoe, whereby said carriage and cradle pivot vertically as a unit in response to forces acting on said tensioned line and said apparatus as a whole is swingable horizontally by said tensioned line, said shoe and carriage being resiliently retractable by said received trolley for moving said sheave axis away from said cradle axis whereupon said tensioned line acts as a flexible cam urging the cradle into a horizontal disposition.

6. The apparatus of claim 5 further including:
a pair of spaced stanchions mounted at said station,
a block vertically reciprocable along said stanchions,
said outrigger member being pivotally mounted on said block, and
said tensioned and haul lines being carried by said block and said outrigger.

7. The apparatus of claim 6 further including:
a pair of elongate laterally-extending alignment arms pivotally carried medially one on each side of said outrigger on aligned vertical axes,
a cam track carried by each stanchion and extending substantially the full length thereof, said arms being provided at their inner ends with cam track-engaging means and further having their outer ends disposed for pivotally closing about said tensioned line outwardly of said cradle, and
means normally urging said arms into an opened position,
said cam tracks being shaped to close said arms during a decending movement of said reciprocable block along said stanchions and, further, during said movement, to cause said arms to pivotally swing into a position normal to said stanchions, whereby said apparatus is moved into said normal position.

8. The apparatus of claim 5 wherein said outrigger member is pivotally carried on a pair of vertically aligned hinge pins and said outrigger mounts an idler sheave, said tensioned line being reeved through the upper hinge pin downwardly around said sheave and then through the pass of said cradle sheaves, said sheave being so disposed that the extent of line from said outrigger sheave to said cradle sheaves normally is substantially horizontal.

9. The apparatus of claim 8 wherein said haul line is reeved through said lower hinge pin.

No references cited.

ARTHUR L. LA POINT, *Primary Examiner.*

F. W. MONAGHAN, *Assistant Examiner.*